UNITED STATES PATENT OFFICE.

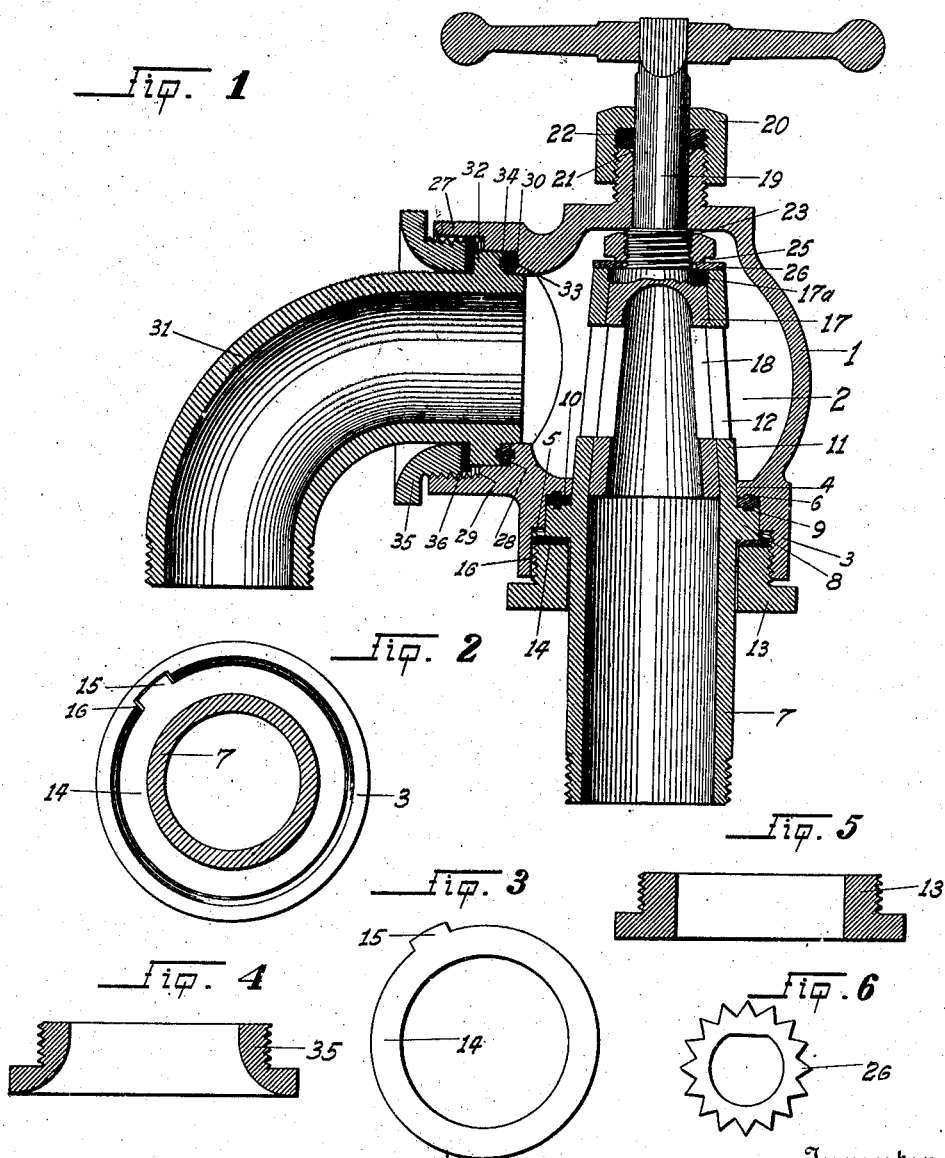

CHARLES C. CORLEW, OF BRODERICK, CALIFORNIA.

HOSE-HYDRANT.

No. 924,041.  Specification of Letters Patent.  Patented June 8, 1909.

Application filed September 11, 1907. Serial No. 392,267.

*To all whom it may concern:*

Be it known that I, CHARLES C. CORLEW, a citizen of the United States, residing at Broderick, in the county of Yolo, State of California, have invented certain new and useful Improvements in Hose - Hydrants; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in hose couplings and particularly to hydrants or faucets, my object being to produce a hydrant which may be inexpensively and easily constructed and in which all the parts will be compact and effective for the purpose for which they are designed. This object I accomplish by such construction and relative arrangement of parts as will appear by a perusal of the following specification and claim.

In the drawings similar characters of reference indicate corresponding parts in the several views.

Figure 1 is a vertical section of the complete hydrant. Fig. 2 is a sectional view showing a lock washer mechanism. Fig. 3 is a top plan view of a lock washer. Fig. 4 is a sectional view of threaded adjusting collars. Fig. 5 is also a sectional view of a threaded adjusting collar. Fig. 6 is a top plan view of a serrated washer.

Referring more particularly to the characters of reference on the drawings 1 designates the main head or casing of the hydrant the same having the usual hollow chamber 2.

3 designates the inlet to the chamber 2 which inlet is formed with shoulders 4 and 5 spaced apart one below the other the interior of the member 3 below the shoulder 5 being threaded. The face of the shoulder 4 is formed with an annular groove 6 for the purpose as will appear.

7 is the inlet pipe formed with a flange 8 the inner face of such flange being formed with an annular groove 9 similar to the groove 6. The flange 8 fits normally against the shoulder 4 with packing 10 disposed intermediate the two, said packing filling into the grooves 6 and 9 thus lessening the liability of leakage.

Formed as a part of the inlet pipe 7 is a hollow conical casing 11 extending into the chamber 2, said casing 11 being provided with transverse slots 12 in the sides thereof. The flange 8 is held in engagement with the shoulder 4 by means of a threaded collar 13 screwed into the lower end of the inlet 3, there being a washer 14 disposed intermediate the flange and said collars, said washer being locked in position by means of a lug 15 fitting into a slot 16 in the side of a member 3.

17 is a hollow plug turnably disposed within the casing 11, opening into the pipe 7, and provided with slots 18 which may be brought into register with the slots 12. Upward from the plug 17 is a stem 19 extending through the cap 20 of the head, said head having a flare 21 at its top to receive the packing 22, thus making the same tighter. The lower end of the stem 19 is threaded (23), to receive a nut 24 adapted to bear against the top of the casing 11 thus locking the plug 17 therein. On the lower end of the nut 24 is a shoulder 25 which bears against an intermediate flexible serrated washer 26, all for the purpose as will appear. The upper end of the casing 11 is formed with an annular recess 17ª also for the purpose as will appear.

27 designates the outlet from the head 1 the same being formed with offset shoulders 28 and 29 spaced apart, the face of the shoulders 28 being formed with an annular groove 30 and the outer end of the outlet 27 being interiorly threaded.

31 is a quarter circular discharge nozzle provided with a flange. 32 adapted to bear normally against the shoulder 28 with intermediate packing 33, the face of said flange being provided with an annular groove 34 the packing filling into the grooves 30 and 34, making a tighter joint. The flange 32 is held in position by a collar 35 screwed into the outer end of the member 27, there being an intermediate washer 36 locked in position as is the washer 14. The inner end of the collar 35 fits snugly around the member 31 and flares outward therefrom. This flare permits the collar to be fitted over the nozzle 31, following the radial line thereof which would not be possible otherwise unless the diameter of said collar was increased which would defeat the object of having it fit snugly around said member 31.

In practice the plug 17 is inserted and secured in the casing 11 as described before it is inserted in the head 1, and is then secured therein by the collar 12 as described.

The flanged construction of the members 7 and 31 permit them to be freely turnable in any direction, the advantages of which are obvious.

The object of having the serrated flexible washer 26 and the shoulder 25 is as follows:— In turning steam or other heated material through the hydrant the plug 19 might become expanded and stick. If such occurs then the operator grasps the stem and presses downward thereon and the washer being flexible and this flexibility being added to by the serrated edge of said washer and the shoulder 25 on the nut 24, it permits the plug 19 to be depressed, and thus by reason of the conical shape of the plug, loosens it up and permits it to turn with more freedom. The groove 17ª also aids in this object by making a space for the washer to be pressed into.

Thus it will be seen that I have produced such a device as substantially fulfils all the objects of the invention as set forth herein.

While this specification sets forth in detail the present and preferred construction of the invention, still many deviations therefrom may be resorted to without departing from the spirit of the invention.

Having thus described my invention what I claim as new and desire to secure by Letters Patent is:—

In a device of the character described the combination of a head, a freely turnable discharge outlet from said head, an inlet into said head, a freely turnable pipe in said inlet, a casing upward from said pipe within said head and having transverse slots therein, a hollow plug turnably disposed within said casing and having slots adapted to be brought into register with said first named slots, a stem upward from said plug, the lower end of said stem being threaded, a nut mounted on said threaded portion, a shoulder on the lower end of said nut, a flexible washer encircling said stem intermediate said shoulder and the top of said casing, said washer having a serrated edge, the upper end of said casing being recessed around the upper end of said plug, as and for the purpose set forth.

In testimony whereof I affix my signature in presence of two witnesses.

CHARLES C. CORLEW.

Witnesses:
PERCY S. WEBSTER,
JOSHUA B. WEBSTER.